(12) United States Patent
Schipman

(10) Patent No.: US 7,425,015 B1
(45) Date of Patent: Sep. 16, 2008

(54) HEIGHT ADJUSTMENT HITCH APPARATUS

(76) Inventor: Leslie Lynn Schipman, 77 Highway 12 East, Townsend, MT (US) 59644

( * ) Notice: Subject to any disclaimer, the term of this patent is extended or adjusted under 35 U.S.C. 154(b) by 236 days.

(21) Appl. No.: 11/509,657

(22) Filed: Aug. 25, 2006

(51) Int. Cl.
*B60D 1/46* (2006.01)

(52) U.S. Cl. .................. 280/490.1; 280/400; 280/504; 280/511

(58) Field of Classification Search ............. 280/490.1, 280/400, 504, 511
See application file for complete search history.

(56) References Cited

U.S. PATENT DOCUMENTS

| | | | |
|---|---|---|---|
| 3,035,856 A * | 5/1962 | Mleczko et al. | 280/490.1 |
| 4,103,928 A * | 8/1978 | Sheppard, Jr. | 280/490.1 |
| 4,664,585 A | 5/1987 | Ambridge et al. | |
| 5,174,550 A * | 12/1992 | Pittman | 254/420 |
| 5,366,338 A | 11/1994 | Mortensen | |
| 5,423,518 A * | 6/1995 | Baxter et al. | 254/419 |
| 5,520,030 A | 5/1996 | Muldoon | |
| 5,575,493 A | 11/1996 | Schwartz et al. | |
| 6,095,748 A | 8/2000 | Zackovich | |
| 6,267,357 B1 * | 7/2001 | Ebey et al. | 254/419 |
| 6,663,133 B1 * | 12/2003 | Rosenlund | 280/490.1 |
| 6,926,261 B1 * | 8/2005 | Renshaw | 254/420 |
| 2003/0222426 A1 * | 12/2003 | Rosenlund | 280/490.1 |
| 2004/0195801 A1 * | 10/2004 | Lara | 280/490.1 |
| 2008/0061211 A1 * | 3/2008 | Madsen | 248/519 |

* cited by examiner

*Primary Examiner*—J. Allen Shriver
*Assistant Examiner*—Tashiana Adams
(74) *Attorney, Agent, or Firm*—William L. MacBride, Jr.; Gough, Shanahan, Johnson, and Waterman PLLP

(57) ABSTRACT

A apparatus having a height adjustment mechanism to adjust the height of a trailer. The height adjustment mechanism is comprised of, among other elements, an outer tube, a crank assembly having a drive gear, an inner tube having an internally threaded acme nut, and an acme screw assembly. The acme screw assembly is linearly and cooperatively assembled such that the crank assembly causes the elongated acme screw to thread vertically through the internally threaded acme nut and the acme screw assembly to concurrently move vertically. The outer tube telescopically and slidably encases the inner tube, such that the outer tube can be vertically adjusted with respect to the inner tube when the crank assembly is operated. The trailer has a trailer hitch including a hitching end integrally secured to the outer tube outside surface, and is integrally attached to the trailer hitch at the trailer end. The trailer is adjusted vertically, concurrently when the crank assembly to the height adjustment mechanism is operated.

12 Claims, 8 Drawing Sheets

HEIGHT ADJUSTMENT HITCH APPARATUS

FIELD OF THE INVENTION

The present invention generally relates to an apparatus having a height adjustment mechanism coupled or mounted to a towing vehicle or unit, for adjusting the height of a trailer hitch to a trailer. In one aspect, the apparatus comprises a height adjustment device or coupling, said height adjustment device utilizing a hand crank being selectively cranked to permit height adjustment of a gooseneck hitch to a trailer.

BACKGROUND OF THE INVENTION

Apparatuses for height adjustment couplings for a trailer hitch are known. References in the related art are directed to forms of height adjustment devices or couplings; however, none of the related art references teaches the adjustment mechanism as proposed by the present invention.

Proper height adjustment to keep a trailer as level as possible is very important to the safe and efficient operation of any trailer by a towing vehicle or other towing unit. A level trailer distributes the weight evenly to all tires of the towing vehicle and trailer, creating a more stable and straighter trailer during towing, improving pulling performance. Tires in the trailer and towing vehicle will heat-up less and wear better, thereby lasting longer, when a trailer that is level distributes the load equally to all such tires. A level trailer distributes the weight of a load evenly between the axles of the trailer. Bent axles, broken axles, broken spindles, and broken leaf springs are often caused from excessive weight on one axle caused by unevenly distributed weight from a trailer that is not level. Trailer and towing vehicle brakes perform much better during towing when their weights are evenly distributed to all tires. A level trailer offers a more uniform load to each set of wheel bearings of the wheels to the trailer, creating a longer wheel bearing life for the trailer. In summary, keeping a trailer level, as in the present invention, enhances the wear, safety, and performance of the tires, the axles, the brakes, the wheel bearings, and pulling performance of the trailer and the towing vehicle.

Related art height adjustment apparatuses for towing trailers have many disadvantages. Such devices are limited by their complexity, often requiring two individuals to operate the apparatuses: one person to hold onto an adjusting sleeve, inner tube or other element of the apparatus and make the necessary height adjustment while a second person loosens and tightens set screws or bolts, resets cotter pins or manipulates other height adjustment, load-bearing support elements to said devices. This procedure frequently must be accomplished while the trailer is in a parked position and not coupled to a towing vehicle or other unit. Other related art devices are additionally limited by their safety concerns as well as complexity, requiring the operator to run a parking leg, jack or similar support to the trailer down with the trailer coupled to the towing vehicle, until most of the trailer weight is on the parking leg. The set bolts or other such height adjustment elements to such a device must then be loosened to raise or lower the trailer to the desired height and position using the trailer parking leg. After the desired height is attained, the set bolts are tightened and the parking leg is raised.

Frequently, these related art devices are located on the trailer rather than the towing vehicle or other unit, adding to the complexity of the height adjustment operation, and requiring more than one operator. The related art devices connected to the towing vehicle or other units are generally large and cumbersome, taking up an inordinate amount of room in said towing vehicles.

The operator must complete these complicated steps in the aforementioned related art apparatuses in proper sequence to avoid bodily injury and equipment damage. Such devices are severely limited, being inconvenient, inefficient, and/or unsafe. If their height adjustment is accomplished improperly, by the operator failing to properly fix the height adjustment element to the device or to position the trailer support prior to setting the height adjustment element, or by making another procedural error in hand-adjusting the device, the support features may fail causing injury to the operators or damage to the equipment. With set screw, bolt or cotter pin types of devices, two sets of such support elements are trusted to carry the entire weight of the trailer, a serious safety concern. Adjusting the related art set screw or other related art height adjustment elements requires too much time, too many wrench or other hand tool manipulations, can be difficult to maneuver, and have potential dangerous consequences as noted above. Most trailers are not adjusted to the correct level as a result of the complicated procedure, resulting in the wear, inefficient and safety problems noted above during towing.

Several related art references are directed to height adjustment mechanisms or couplings to trailer hitches. Each of U.S. Pat. No. 4,664,585 to Ambridge et al., U.S. Pat. No. 5,520,030 to Muldoon, U.S. Pat. No. 5,366,338 to Mortensen, U.S. Pat. No. 5,575,493 to Schwartz et al., U.S. Pat. No. 6,095,748 to Zachovich, and U.S. Patent No. 2004/0195801 to Lara disclose height adjusting mechanisms for a trailer hitch; however, none of the references teach the adjustment mechanism as proposed by the current invention. U.S. Pat. No. 5,520,030 to Muldoon discloses a gooseneck trailer locking device having a parking leg, leveling jack located on a trailer operated by a hand crank. U.S. Pat. No. 5,366,338 to Mortensen discloses a motorcycle towing/lifting device with a motorcycle jack operated by a hand crank gear. U.S. Pat. No. 6,095,748 to Zachovich discloses a vehicle lifting device operated by a camming crank. U.S. Pat. No. 4,664,585 to Ambridge et al. discloses a towing vehicle having a lifting beam.

None of these inventions to Muldoon '030, Mortensen '338, Zachovich '748, Ambridge et al. '585, or Schwartz et al. '493 provides the height adjustment elements of the present invention. The height adjustment element of Mortensen '338 discloses merely a lifting device having a winch strap, and that of Muldoon '030 discloses merely the leveling jack attached to the trailer, Zachovich '748 discloses a camming crank device having a riser pivot, Ambridge et al. '585 discloses two hydraulic rams secured to a lifting beam, and Schwartz et al. '493 discloses a hydraulic cylinder attached to a trailer; all of which references lack, and do not teach, the elements of the height adjustment mechanism of the present invention.

U.S. Patent No. 2004/0195801 to Lara and Mortensen '338 disclose load-bearing pins (Lara '801) or locking pins (Mortensen '338) for adjusting the height adjustment mechanism and bearing the load of a gooseneck hitch (Lara '801) or a towed motorcycle (Mortensen '338), which references do not teach the height adjustment mechanism of the present invention. Such related art requires hand tools to carry out the adjustments. Muldoon '030 and Schwartz et al. '493 require the need for a trailer mounted parking leg or landing gear, generally requiring more than one operator for quick, efficient, accurate, and safe height adjustments. Mortensen '338, Zachovich '748, and Ambridge et al. '585 all are complex and cumbersome in their operation, as towing devices, requiring a substantial amount of space and/or power from the towing unit. None of the devices to Muldoon '030, Mortensen '338, Zachovich '748, Ambridge et al. '585, Schwartz et al. '493 or Lara '801 operates in the manner of the present invention, and none of the references to those devices disclose the advantage of the internal screw gear height adjustment mechanism of the present invention. All of the aforementioned related art inventions suffer from one or more of the following disadvantages, set forth above: requiring more than one operator by being located on the trailer, being overly complex in its operation or cumbersome in its size, or by using load-bearing pins or screws or bolts.

OBJECT AND SUMMARY OF THE INVENTION

It is an object of the present invention to provide a hitch apparatus installed to a towing vehicle or other unit, adapted to easily and quickly adjust the height of a trailer. The present invention is operated safely and quickly, in one embodiment, by a turn crank handle in one direction or the other to achieve the desired height adjustment.

Another object of the present invention is to provide a method to adjust the height of the hitch with the trailer coupled to the towing vehicle or other unit or with the trailer in a parked position, coupled or uncoupled from said towing unit.

A further object of the present invention is to provide a height adjustment hitch mechanism that may be safely utilized by one person with no tools required for adjustment, without danger to the operator or equipment. The present invention is convenient to use, accomplishing a height adjustment to the hitch in a few seconds with no tools required for adjustment. The present invention is very dependable, eliminating the requirement for pins, set screws, bolts or other load-bearing elements required in the related art for similar adjustments.

In one embodiment, the present invention provides an apparatus that includes a height adjustment mechanism made of hardened steal. Another embodiment includes said mechanism made of material to withstand at least 39,000 pounds of shear force. In another embodiment, the present invention includes a trailer that is a gooseneck trailer.

In another embodiment, the present invention provides a key keeper aperture to receive a key screw so that the height adjustment mechanism will secure the outer tube and the trailer hitch from inadvertent or unintentional lateral movement.

In another embodiment of the present invention, a free end of the crank handle provides a locking means to prevent inadvertent or unintentional vertical movement of the height adjustment mechanism and the trailer hitch.

In one embodiment of the invention, the height adjustment apparatus, in summary, is a height adjustment mechanism installed to a towing vehicle or other unit and attached by a trailer hitch to a trailer. The height adjustment mechanism is comprised of, among other elements, an outer tube, a crank assembly having a drive gear, an inner tube having an internally threaded acme nut, and an acme screw assembly. The acme screw assembly is linearly and cooperatively assembled such that the crank assembly causes the elongated acme screw to thread vertically through the internally threaded acme nut and the acme screw assembly to concurrently move vertically. The outer tube telescopically and slidably encases the inner tube, such that the outer tube can be vertically adjusted with respect to the inner tube when the crank assembly is operated.

The trailer has a trailer hitch including a hitching end integrally secured to the outer tube outside surface, and is integrally attached to the trailer hitch at the trailer end. The trailer is adjusted vertically, concurrently when the crank assembly to the height adjustment mechanism is operated, whereby the height adjustment apparatus of the present invention adjusts the height of the trailer.

Still further objects and advantages of the present invention will become apparent from a consideration of the ensuing descriptions and drawings.

BRIEF DESCRIPTION OF THE DRAWINGS

The foregoing features and other aspects of the present invention are explained in the following description, taken in conjunction with the accompanying drawings, and other features and objects of the present invention will become apparent from the following detailed description taken in combination with the accompanying drawings. However, the drawings are provided for purposes of illustration only, and are not intended as a definition of the limits of the invention.

DETAILED DESCRIPTION OF THE PREFERRED EMBODIMENTS

The present invention will now be described more fully hereinafter with references to the accompanying drawings, in which the preferred embodiment of the invention is shown. This invention may, however, be embodied in different forms, and should not be construed as limited to the embodiment set forth herein. Rather, the illustrative embodiments are provided so that this disclosure will be thorough and complete, and will full convey the scope of the invention to those skilled in the art. It should be noted and will be appreciated that numerous variations may be made within the scope of this invention without departing from the principle of this invention and without sacrificing its chief advantages. Like numbers refer to like elements throughout.

Figure 1:
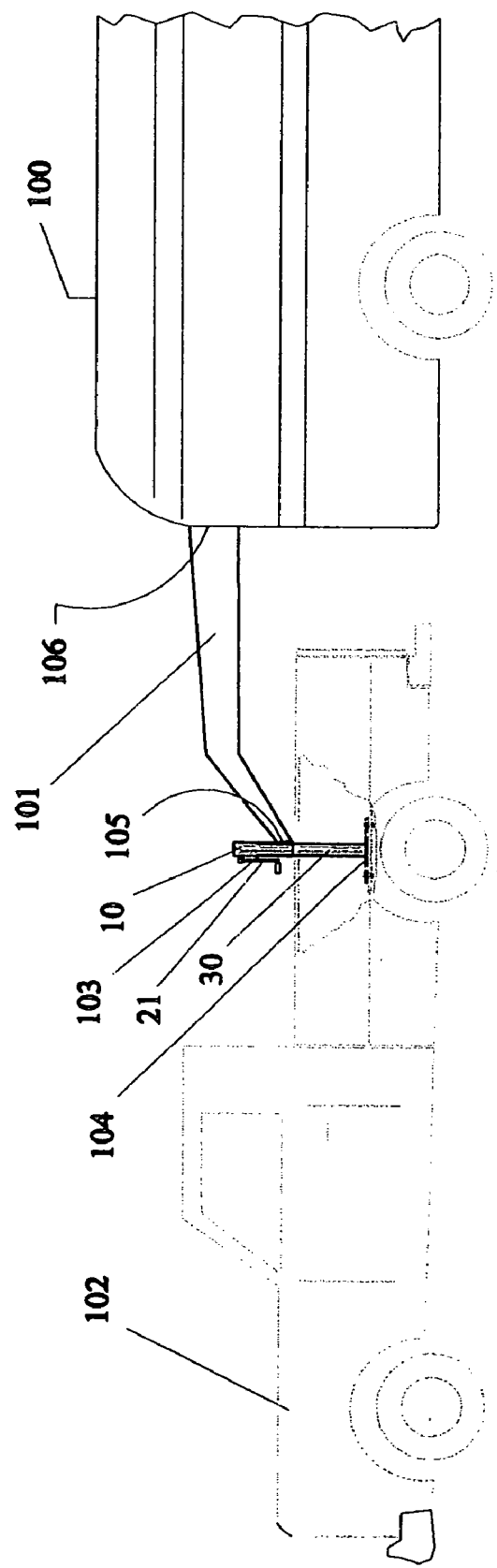
FIG. 1 illustrates one embodiment of the present invention, a partial side, elevational view of a trailer and a towing vehicle, the towing vehicle employing the height adjustment apparatus according to the present invention.

Turning now in detail to the drawings, in accordance with the present invention, one embodiment of the invention, the height adjustment apparatus, is shown in FIG. 1, a partial side, elevational view of a trailer 100 having a trailer hitch 101 and a towing vehicle 102, the towing vehicle 102 employing a height adjustment mechanism 103 according to the present invention. The towing vehicle 102 may be a truck or any other type of towing unit commonly used for towing a trailer, in other embodiments of the invention. The trailer 100 may be any type of commonly used trailer unit employing a gooseneck or similarly configured type of hitch in other embodiments of the invention. Different embodiments of the present invention include said height adjustment mechanism 103 constructed of any round, square, or other shaped, hollow tubing of any form of rigid material and construction well known and commonly used in the applicable art. As is apparent, the apparatus as set forth herein may be constructed from a variety of materials depending upon design considerations. For example, the use of high strength or hardened steels will yield an apparatus having high durability and strength to handle heavy trailer loads, whereas the use of other metals such as aluminum, will provide an apparatus having a light weight for ease of handling and use with lighter trailer loads. In the alternative, a combination of different materials may be used.

Figure 2:
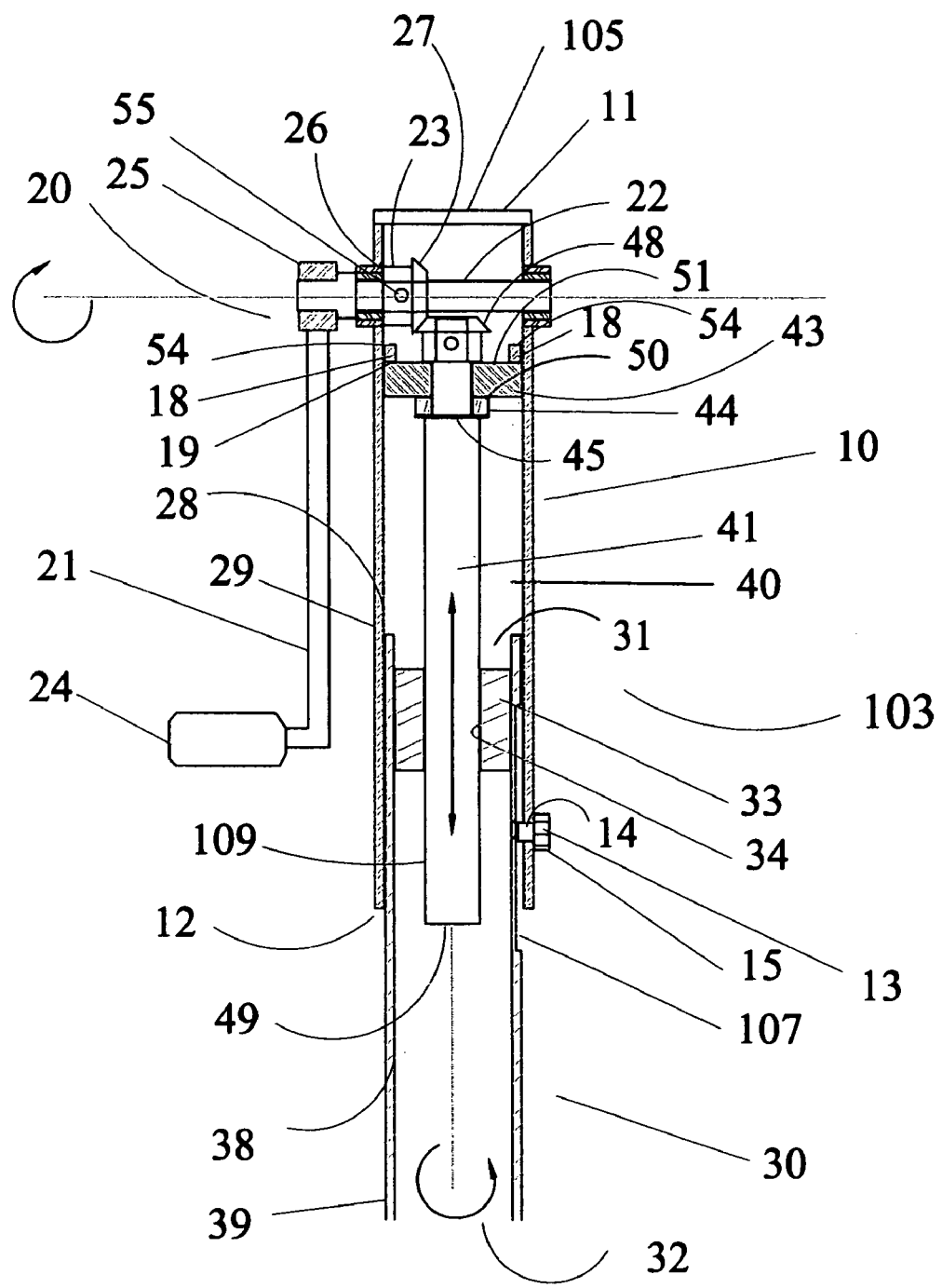
FIG. 2 illustrates one embodiment of the present invention, a side, cross sectional, elevated view of the height adjustment mechanism according to the present invention.

Referring to FIG. 2, one embodiment of the present invention, illustrated is a side, cross sectional, elevated view of the height adjustment mechanism 103 according to the present invention. The height adjustment mechanism 103 comprises an outer tube 10 having an outer tube top end 11 and an opposing outer tube bottom end 12, and an outer tube inside surface 28 and an outer tube outside surface 29.

Figure 3:
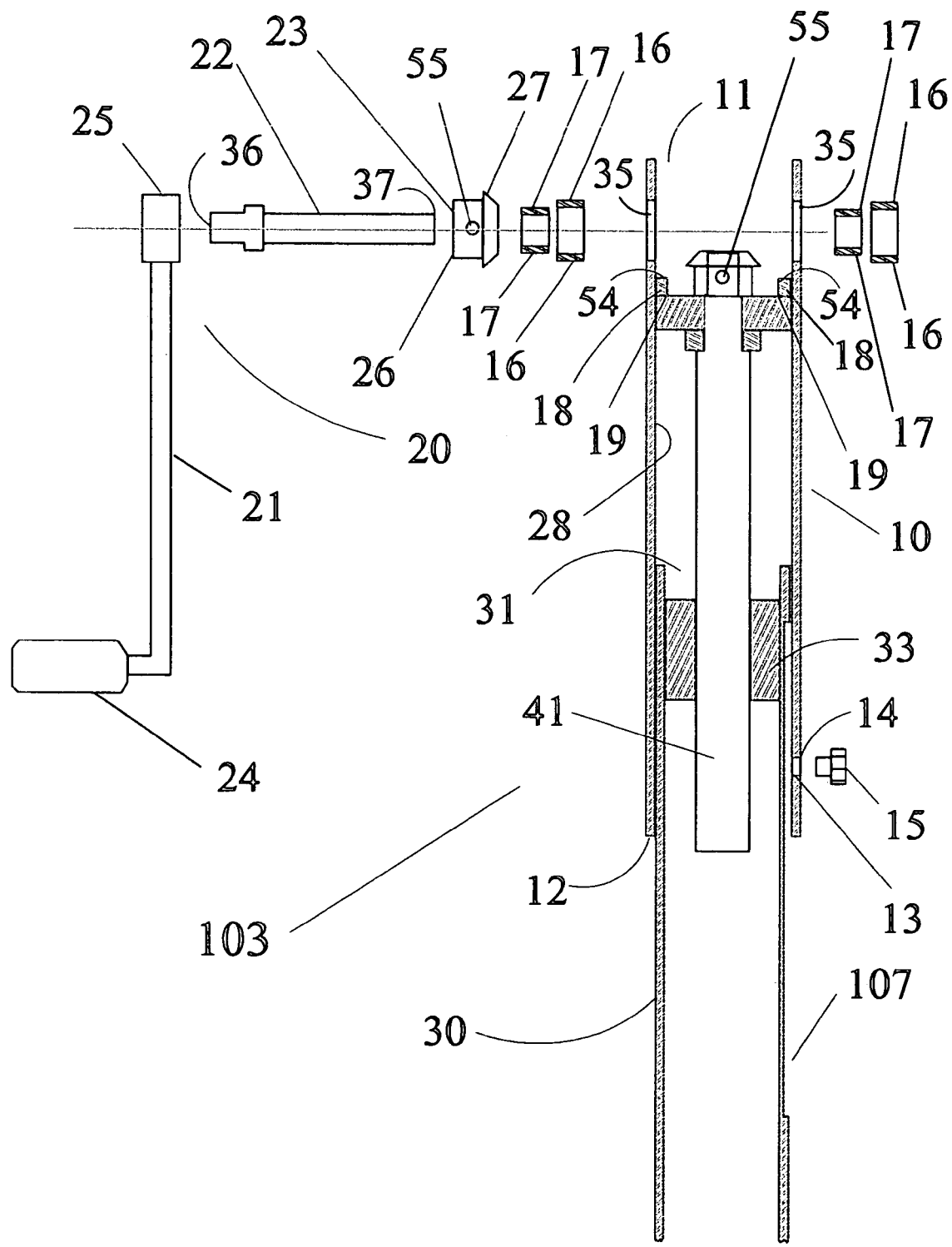
FIG. 3 illustrates one embodiment of the present invention, a partially exploded and side, elevational and cross sectional view of a portion of the height adjustment mechanism according to the present invention.

Referring to FIG. 3, one embodiment of the present invention, a partially exploded and side, elevational and cross sectional view of a portion of the height adjustment mechanism 103, illustrated is a pair of circular hubs 16, oppositely disposed thru opposing shaft apertures 35 located in the outer tube 10 disposed toward the outer tube top end 11; and a pair of circular bushings 17 oppositely disposed within said hubs 16 to cooperatively receive a drive shaft 22 and allow the drive shaft 22 to rotate within said hubs 16. As shown in FIGS. 2 and 3, the pair of circular hubs 16 operate cooperatively with said bushings 17 to receive and secure the drive shaft 22 within the outer tube 10.

FIGS. 2 and 3 further depict a circumferential top plate ring 18, having a top plate ring inner surface 19 and an opposing top plate ring outer surface 54. Said top plate ring 18 is attached to the outer tube inner surface 28 and is located proximally to the pair of circular hubs 16, toward the outer tube bottom end 12.

Referring still further to FIGS. 2 and 3, a crank assembly 20 is depicted comprising a crank handle 21 operating cooperatively and integrally with the drive shaft 22, and a drive gear 23. As shown, the crank handle 21 has a free end 24 and an opposing drive shaft end 25. As shown, as well in FIGS. 2 and 3, the drive shaft 22 has a crank shaft end 36 and an opposing tube shaft end 37; attaches perpendicularly, cooperatively and integrally to the crank handle 21 at the drive shaft end 25 of the crank handle 21; and is seated within the pair of circular hubs 16, thru the outer tube 10, and secured in place by said hubs 16. Still referring to FIGS. 2 and 3, the drive gear 23 has a crank side 26 and an opposing drive gear side 27, and is centrally and circumferentially located along the drive shaft 22 and within the outer tube 10, operating conformably with the drive shaft 22 and having the crank side 26 oriented adjacent to the outer tube inside surface 28. The crank assembly 20 is cooperatively and integrally assembled allowing the crank assembly 20 to turn in unison, when the crank handle 21 is acted upon by an operator.

Referring still further to FIGS. 2 and 3, one embodiment of the present invention, the outer tube 10 is operatively associated with and overlying an inner tube 30 having an inner tube top end 31 and an opposing inner tube bottom end 32, and an inner tube inside surface 38 and an inner tube outside surface 39. The outer tube 10, as depicted, overlaps the inner tube 30 directionally from the inner tube top end 31. The inner tube 30 is further comprised of an internally threaded acme nut 33 having a threaded inner nut surface 34, said acme nut 33 circumferentially attached to the inner tube inside surface 38, disposed for receiving a partially threaded, elongated acme screw 41, and located proximally to the inner tube top end 31.

Figure 4:
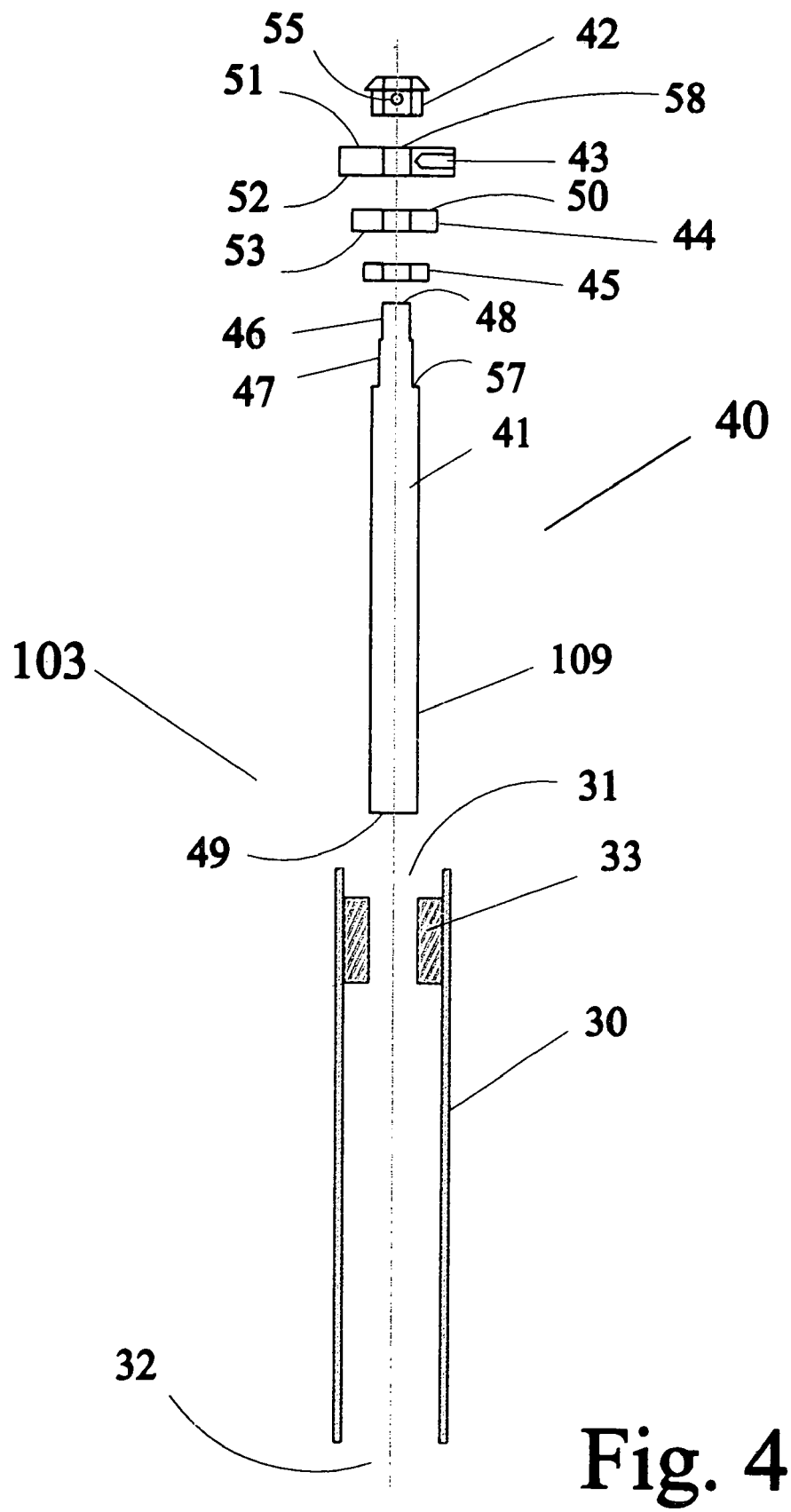
FIG. 4 illustrates one embodiment of the present invention, a side view of the height adjustment mechanism and partially exploded view of the acme screw assembly according to the present invention.

Referring further to FIG. 2 and to FIG. 4, one embodiment of the present invention depicting a side view of the height adjustment mechanism 103 and partially exploded view of the acme screw assembly 40, the acme screw assembly 40 is shown comprising said elongated acme screw 41 suspensionally located and freely rotatable within the inner tube 30 and cooperatively engaged in the inner tube 30 within the internally threaded acme nut 33, and having an acme screw top surface 48 and an opposing acme screw bottom surface 49, and an unthreaded first rod surface 46 contiguous to the acme screw top surface 48, and an unthreaded second rod surface 47 radially larger than said first rod surface 46 and radially smaller than a threaded screw surface 109 of said elongated acme screw 41, and an acme screw threaded top surface 57, said second rod surface 47 located contiguous to and between said first rod surface 46 and the acme screw threaded top surface 57.

As shown in FIGS. 2, 3 and 4, the acme screw assembly 40 further comprises a screw gear 42 circumferentially, cooperatively, and integrally fitted on the acme screw top surface 48 and around said first rod surface 46 by a fastening means 55 to cooperatively and differentially engage the drive gear 23 and concurrently drive said elongated acme screw 41; a cylindrical top plate 43 having a top plate upper surface 51 and an opposing top plate lower surface 52 and a centrally located top plate aperture 58 thru said top plate 43, said top plate circumferentially and cooperatively engaged onto said elongated acme screw 41 having said second rod surface 47 located through said top plate aperture 58, and the top plate upper surface 51 located immediately against the top plate ring inner surface 19. The cylindrical top plate 43 is secured to the outer tube 10 by a plurality of fastening means 56, as depicted in detail in FIGS. 5A and 5B, other embodiments of the present invention.

The acme screw assembly 40, as depicted in FIGS. 2 and 4, further comprises a thrust bearing 44 having an upper bearing surface 50 and an opposing lower bearing surface 53, securely and circumferentially engaged around said second rod surface 47 and immediately, vertically beneath said top plate 43; and a washer 45 interposed between the thrust bearing 44 and acme screw threaded top surface 57, and around said elongated acme screw 41, allowing the thrust bearing 44 to revolve freely about said second rod surface 47.

Figure 5A:
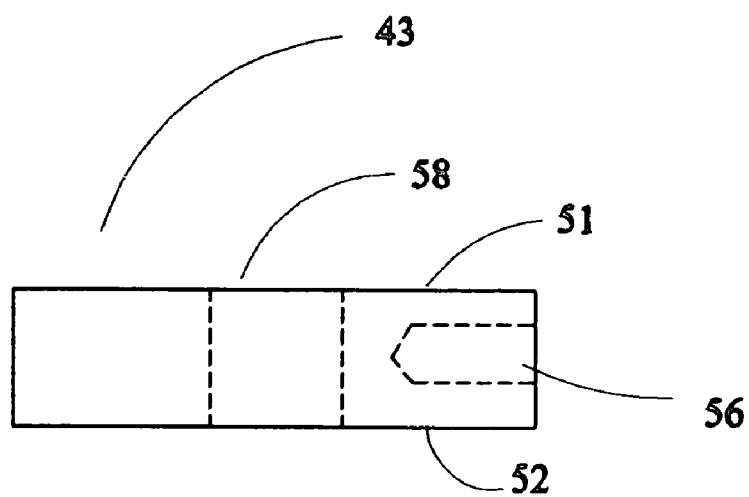
FIG. 5A illustrates one embodiment of the present invention, an elevated side view of the cylindrical top plate to the height adjustment mechanism according to the present invention.
Figure 5B:
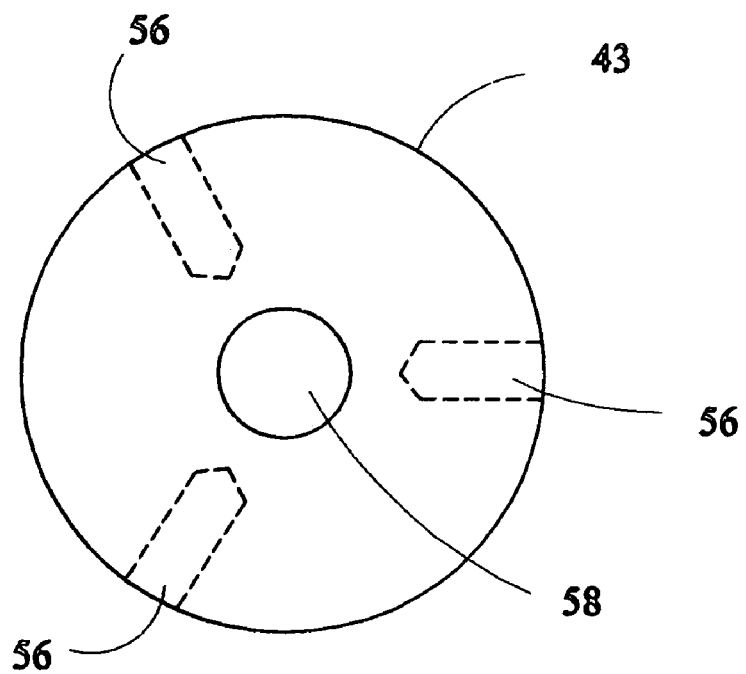
FIG. 5B illustrates one embodiment of the present invention, a top view of the cylindrical top plate to the height adjustment mechanism according to the present invention.

As is apparent, shown in FIGS. 3, 5A, and 5B, different embodiments of the present invention include the fastening means 55 and the plurality of fastening means 56 comprising, respectively, threaded fasteners, such as screws, nuts, and bolts, or metal or other weldings, pins, rivets, and other such fastening means well known and commonly used in the applicable art. As depicted in FIGS. 2 and 3, the internally threaded acme nut 33, an internally key screw 15, the top plate ring 18, and the pair of circular hubs 16 are attached to the inner tube 30 or the outer tube 10, respectively, by the use of metal weldings or other suitable attaching means well known and commonly used in the art.

Figure 6:
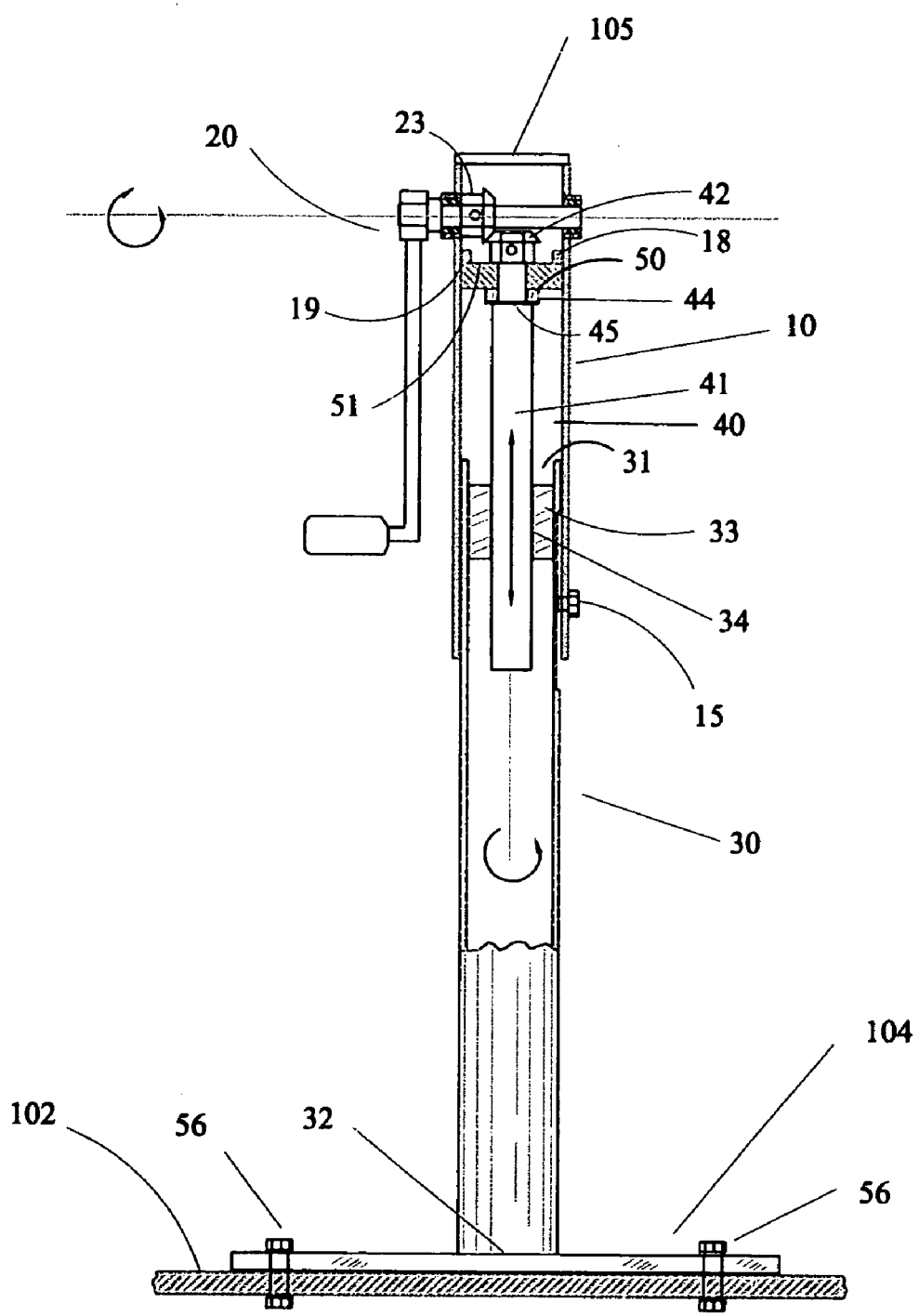
FIG. 6 illustrates one embodiment of the present invention, a perspective and partial side view of the height adjustment mechanism according to the present invention.

Referring to FIG. 6, one embodiment of the present invention, a perspective and partial side view of the height adjustment mechanism, the acme screw assembly 40 is linearly and cooperatively assembled allowing the screw gear 42, thrust bearing 44, washer 45, and said elongated acme screw 41 to turn in unison. As further depicted in FIG. 6, the acme screw assembly 40 extends vertically above the inner tube top end 31, and the drive gear 23 on the crank assembly 20 is situated immediately against and is differentially engaging the screw gear 42 on the acme screw assembly 40 for driving said elongated acme screw 41. Further referring to FIG. 6, the crank assembly 20 causes the elongated acme screw 41 to thread vertically through the internally threaded acme nut 33 located in the inner tube 30 and the acme screw assembly 40 to concurrently move vertically when the drive gear 23 to the crank assembly 20 is activated by cranking the crank assembly 20. Further referring to FIGS. 2 and 6, the top plate upper surface 51 engages the top plate ring inner surface 19 rendering the acme screw assembly 40 load-bearing to move the outer tube 10 vertically when the acme screw assembly 40 is activated by cranking the crank assembly 20. As is apparent, different embodiments of the present invention include activating the crank assembly 20 and the crank handle 21 by manual or motorized cranking mechanisms or other means well known and recognized in the art.

Figure 7:
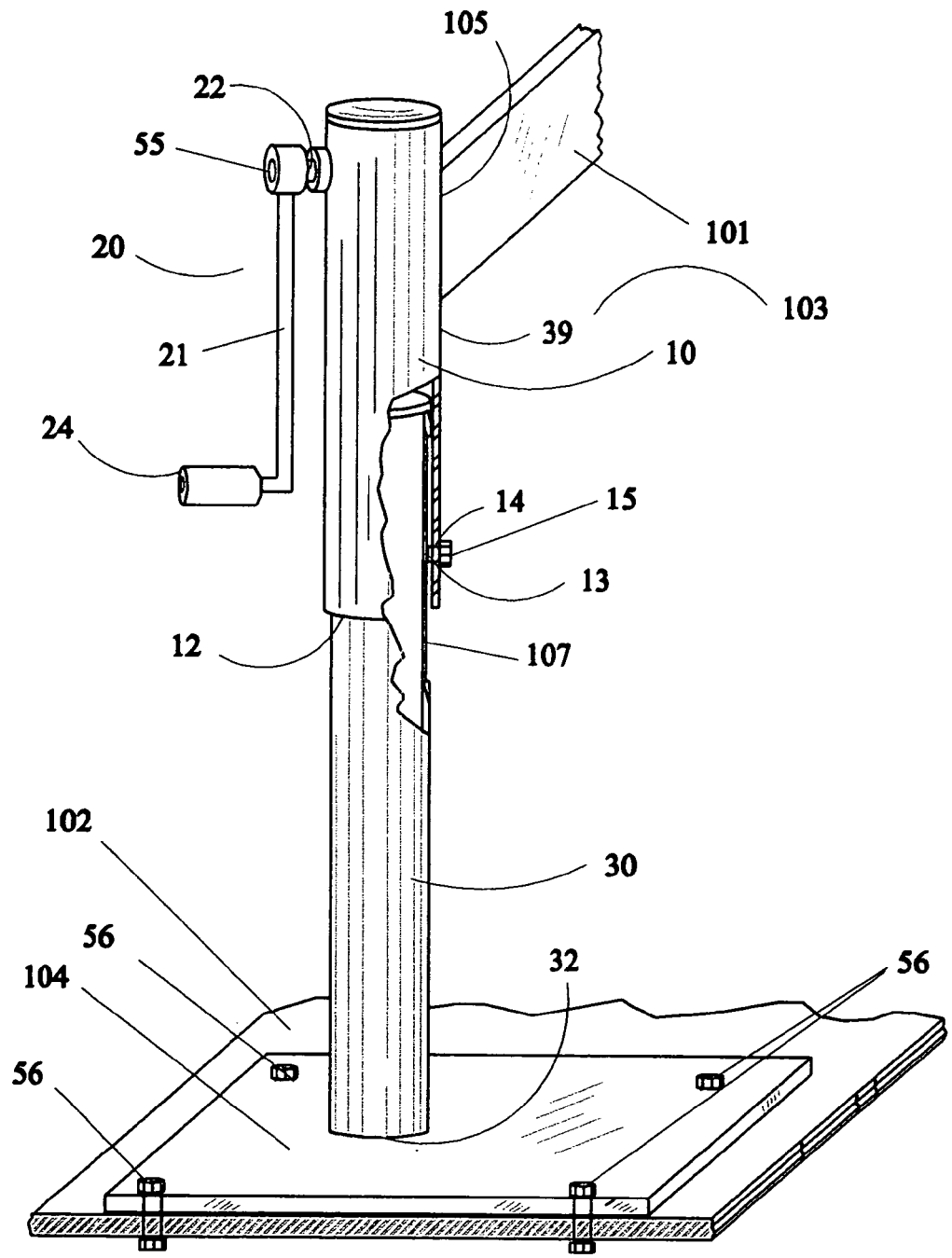
FIG. 7 illustrates one embodiment of the present invention, perspective view, and a partial view of the threaded key screw, key keeper aperture and key way of the height adjustment mechanism according to the present invention.

Further referring to FIGS. 2 and 6, one embodiment of the present invention, the height adjustment mechanism 103 is linearly and integrally assembled, the outer tube 10 telescopically and slidably encasing the inner tube 30, such that the outer tube 10 can be vertically adjusted with respect to the inner tube 30 when the crank assembly 20 is operated. Referring to FIGS. 1 and 6, and FIG. 7, one embodiment of the present invention, the height adjustment mechanism 103 is securely installed on a towing vehicle 102 by a mounting means 104 for securing the height adjustment mechanism 103, said mounting means 104 located at the inner tube bottom end 32 of the height adjustment mechanism 103 for securing the height adjustment mechanism 103 by the plurality of fastening means 56 to the towing vehicle 102. As is apparent, different embodiments of the present invention include a mounting means 104 comprising a ball hitch and mount, opposing plates welded to the height adjustment mechanism 103 and the towing vehicle 102, respectively, and fastened by nuts and bolts or other fastening means, combinations of the foregoing ball hitch and plate devices, and other suitable trailer hitch/towing vehicle coupling assemblies commonly known and used in the art.

Referring again to FIGS. 1, 7 and 8, the trailer 100 has a trailer hitch 101 including a hitching end 105 integrally secured to the outer tube outside surface 39 and a trailer end 106. The trailer 100, as depicted, is integrally attached to the trailer hitch 101 at the trailer end 106. The trailer 100 is adjusted vertically, concurrently when the crank assembly 20 to the height adjustment mechanism 103 is operated, whereby the height adjustment apparatus of the present invention adjusts the height of the trailer 100. The trailer hitch 101 is integrally attached to the trailer 100 at the trailer end 106 and to the height adjustment mechanism 103 at the hitching end 105, respectively, by the use of metal weldings or other suitable attaching means well known and commonly used in the art.

To operate the height adjustment apparatus, a desired height to the trailer 100 is determined. Should a new desired height be determined, the outer tube 10 can be re-adjusted via the crank handle 21 relative to the inner tube 30 until a new, desired height of the trailer 100 is achieved. The elongated acme screw 41 being load bearing permits adjustability of the height adjustment mechanism 103 and therefore the entire height adjustment apparatus, while bearing the vertical load supplied by the attached trailer 100, any accessories to the trailer 100 and any contents to the trailer 100. These two functions are simultaneously and/or concurrently performed without relying on the force of friction to maintain the height or level adjustment of the height adjustment mechanism 103.

In one embodiment of the present intention, the outer tube 10, can maintain the desired height of the height adjustment mechanism 103 and concurrently bear all, or substantially all, of the vertical load of the attached trailer 100, any accessories to the trailer 100 and any contents to the trailer 100.

In one embodiment of the present invention, the height adjustment mechanism 103 is made of hardened steel. In another embodiment of the present invention, the height adjustment mechanism 103 is made of material to withstand at least 39,000 pounds of shear force.

In another embodiment of the present invention the trailer hitch 101 to the height adjustment apparatus as generally depicted in FIG. 1 is a gooseneck trailer hitch to a gooseneck trailer.

Referring further to FIGS. 2 and 3, and FIG. 7, in another embodiment of the present invention, a key keeper aperture 13 is cooperatively disposed in the outer tube 10 and located toward the outer tube bottom end 12, the key keeper aperture 13 having a threaded inner key surface 14 for cooperatively receiving the threaded key screw 15. The inner tube outside surface 39 contains a key way 107 set vertically in the inner tube outside surface 39 to cooperatively hold said key screw 15 in place against the inner tube 30, said key screw 15 lodging in the key way 107 and securing the outer tube 10 in place when said key screw 15 is screwed into the key keeper aperture 13, co-axially aligning the inner tube 30 with the outer tube 10, preventing lateral movement of the height adjustment mechanism 103, thereby preventing the trailer hitch 101 from adjusting laterally inadvertently.

Figure 8:
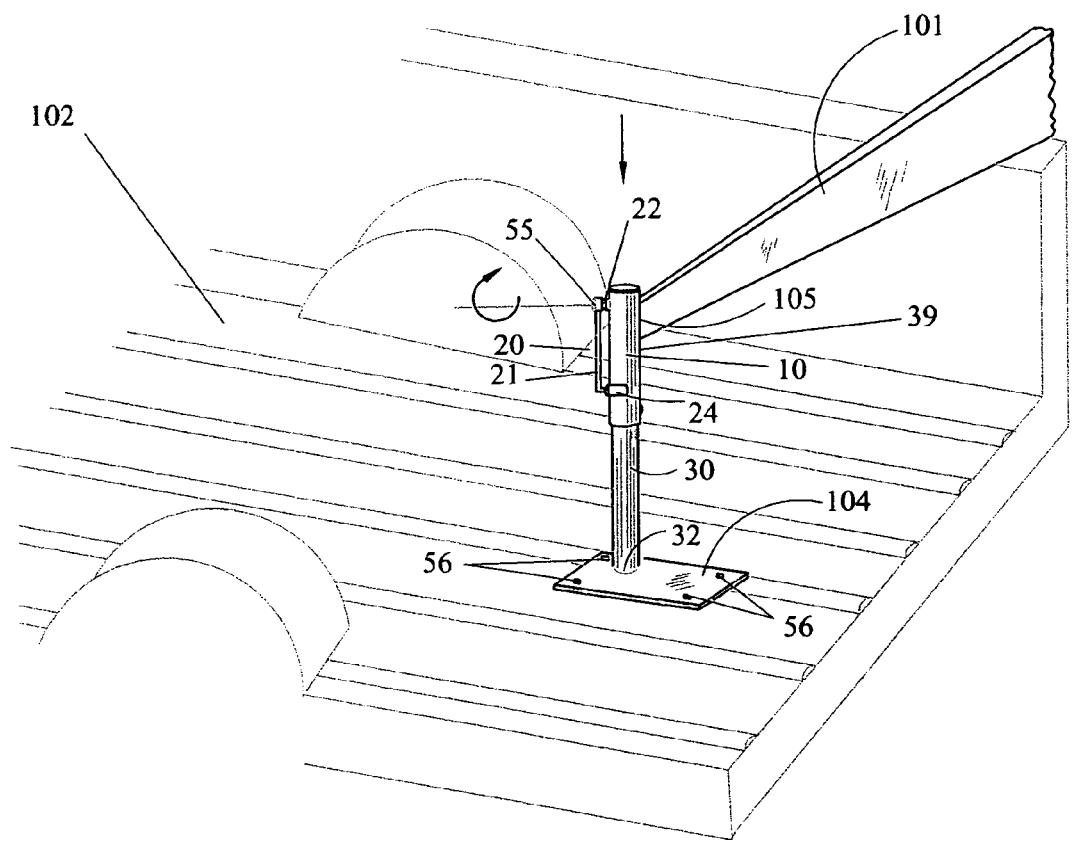
FIG. 8 illustrates one embodiment of the present invention, a perspective view of the height adjustment apparatus according to one embodiment of the present invention.

In another embodiment of the present invention, as depicted in FIG. 8, the free end 24 of the crank handle 21 is utilized as a locking means for preventing vertical movement of the height adjustment mechanism 103. As shown in FIGS. 7 and 8, the crank handle 21 is reversibly attached to the drive shaft 22 by a fastening means 55, and when reversibly attached the free end 24 of the reversely installed crank assembly 20 is held in place by the outer tube 10, and thereby preventing the trailer hitch 101 from adjusting vertically inadvertently or unintentionally.

In another embodiment of the present invention, the invention provides a method of adjusting the height of the trailer 100. Another object of the present invention is to provide a method to adjust the height of the trailer hitch 101 with the trailer 100 coupled to the towing vehicle 102 or with the trailer 100 in a parked position, coupled or uncoupled from said towing vehicle 102, thereby adjusting the height of the trailer 100. As is readily apparent, a further embodiment of the present invention as a method of adjusting the height of a trailer 100 is a method for leveling the trailer 100.

Unless otherwise specifically stated, the terms and expressions have been used herein as terms of description and not terms of limitation. There is no intention to use the terms or expressions to exclude any equivalents of features shown and described or portions thereof. Various changes can, of course, be made to the preferred embodiment of the present invention without departing from the spirit and scope of the present invention. The present invention, therefore, should not be restricted, except to the following claims and their equivalents.

I claim:

1. A height adjustment apparatus for use with a trailer, said apparatus compromising:
   (a) an outer tube having an outer tube top end and an opposing outer tube bottom end, and an outer tube inside surface and an opposing outer tube outside surface, the outer tube further comprising:
      (1) a pair of circular hubs opposingly disposed thru opposing shaft apertures located in the outer tube, said shaft apertures and said hubs being disposed toward the outer tube top end;
      (2) a pair of circular bushings opposingly disposed within said hubs, said bushings cooperatively receiving a drive shaft and allowing the drive shaft to rotate within said hubs;
      (3) the pair of circular hubs operating cooperatively with said bushings to receive and secure the drive shaft within the outer tube;
      (4) a circumferential top plate ring, having a top plate ring inner surface and an opposing top plate ring outer surface, and being attached to the outer tube inside surface and located proximally to the pair of circular hubs, toward the outer tube bottom end;
      (5) a crank assembly comprising a crank handle operating cooperatively and integrally with the drive shaft, and with a drive gear;
      (6) the crank handle having a free end and an opposing drive shaft end;
      (7) the drive shaft having a crank shaft end and an opposing tube shaft end;
      (8) the drive shaft attaching perpendicularly, cooperatively and integrally to the crank handle at the drive shaft end;
      (9) the drive shaft being seated within the pair of circular hubs, thru the outer tube, and secured in place by said hubs;
      (10) the drive gear having a crank side and an opposing drive gear side, and being centrally and circumferentially located along the drive shaft and within the outer tube, operating conformably with the drive shaft and having the crank side oriented adjacent to the outer tube inside surface;
      (11) the crank assembly being cooperatively and integrally assembled allowing the crank handle, the drive shaft, and the drive gear to turn in unison;
   (b) the outer tube operatively associated with, and overlying an inner tube, said inner tube having an inner tube top end and an opposing inner tube bottom end, and an inner tube inside surface and an opposing inner tube outside surface, said outer tube overlapping the inner tube directionally from the inner tube top end, and the inner tube further comprising:
      (1) an internally threaded acme nut having a threaded inner nut surface;
      (2) said acme nut circumferentially attached to the inner tube inside surface and disposed for receiving a partially threaded, elongated acme screw, said acme nut being located proximally to the inner tube top end;
   (c) an acme screw assembly, comprising said elongated acme screw suspensionally located and freely rotatable within the inner tube and cooperatively engaged to the inner tube within the internally threaded acme nut, and having an acme screw top surface and an opposing acme screw bottom surface, an unthreaded first rod surface contiguous to the acme screw top surface and an unthreaded second rod surface radially larger than said first rod surface and radially smaller than a threaded screw surface to said elongated acme screw, and an acme screw threaded top surface, said second rod surface being located contiguous to and between said first rod surface and the acme screw threaded top surface, the acme screw assembly further comprising:
      (1) a screw gear circumferentially, cooperatively, and integrally fitted on the acme screw top surface and around said first rod surface by a fastening means to cooperatively and differentially engage the drive gear and concurrently drive said elongated acme screw;
      (2) a cylindrical top plate having a top plate upper surface, an opposing top plate lower surface, and a centrally located top plate aperture thru said top plate;
      (3) said top plate circumferentially and cooperatively engaged onto said elongated acme screw having said second rod surface located through said top plate aperture, the top plate upper surface being located immediately against the top plate ring inner surface, and said top plate being secured to the outer tube by a plurality of fastening means;
      (4) a thrust bearing, having an upper bearing surface and an opposing lower bearing surface, securely and circumferentially engaged around said elongated acme screw along said second rod surface and immediately, vertically beneath the top plate;
      (5) a washer interposed between the thrust bearing and the acme screw threaded top surface, and around said elongated acme screw, allowing the thrust bearing to revolve freely about said second rod surface;
      (6) the screw gear, top plate, thrust bearing, and washer being circumferentially and sequentially engaged onto said elongated acme screw;
      (7) the acme screw assembly being linearly and cooperatively assembled allowing the screw gear, thrust bearing, washer and said elongated acme screw to turn in unison;
      (8) the acme screw assembly extending vertically above the inner tube top end;
      (9) the drive gear on the crank assembly being situated immediately against and differentially engaging the screw gear to the acme screw assembly for driving said elongated acme screw;
   (d) the crank assembly causing said elongated acme screw to thread vertically through the internally threaded acme nut and the acme screw assembly to concurrently move vertically when the drive gear to the crank assembly is activated by cranking the crank assembly;
   (e) the top plate upper surface engaging the top plate ring inner surface rendering the acme screw assembly load-bearing to move the outer tube vertically, when the acme screw assembly is activated by cranking the crank assembly;
   (f) the height adjustment mechanism being linearly and integrally assembled, the outer tube telescopically and slidably encasing the inner tube, such that the outer tube can be vertically adjusted with respect to the inner tube when the crank assembly is operated;
   (g) a mounting means for securely installing the height adjustment mechanism to a towing vehicle, said mounting means located at the inner tube bottom end of the height adjustment mechanism;
   (h) the trailer having a trailer hitch including a hitching end integrally secured to the outer tube outside surface and a trailer end;

(i) the trailer integrally attached to the trailer hitch at the trailer end;
(j) the trailer concurrently adjusting vertically when the crank assembly to the height adjustment mechanism is operated; and
(k) whereby the height adjustment apparatus adjusts the height of the trailer.

2. A height adjustment apparatus as in claim 1, wherein:
(a) said mechanism is made of hardened steel.

3. A height adjustment apparatus as in claim 1, wherein:
(a) said mechanism is made of material to withstand at least 39,000 pounds of shear force.

4. A height adjustment apparatus as in claim 1, wherein:
(a) the trailer is a gooseneck trailer.

5. A height adjustment apparatus as in claim 1, wherein:
(a) a key keeper aperture is cooperatively disposed in the outer tube located toward the outer tube bottom end, the key keeper aperture having a threaded inner key surface for cooperatively receiving a threaded key screw;
(b) the inner tube outside surface containing a key way set vertically in the inner tube outside surface cooperatively hold said key screw in place against the inner tube; and
(c) the threaded key screw lodging in the key way securing the outer tube in place when said key screw is screwed into the key keeper aperture, co-axially aligning the inner tube with the outer tube, preventing lateral movement of the height adjustment mechanism and thereby preventing the trailer hitch from adjusting laterally inadvertently.

6. A height adjustment apparatus as in claim 1, wherein:
(a) the crank handle being reversibly attached to the drive shaft by the fastening means;
(b) the free end of the crank handle is utilized as a locking means for preventing vertical movement of the height adjustment mechanism, the outer tube holding the free end in place; and
(c) thereby preventing the trailer hitch from moving vertically inadvertently.

7. A method for adjusting the height of a trailer, the method comprising:
(a) having an outer tube with an outer tube top end and an opposing outer tube bottom end, and an outer tube inside surface and an opposing outer tube outside surface, the outer tube further comprising:
  (1) a pair of circular hubs opposingly disposed thru opposing shaft apertures located in the outer tube, said shaft apertures and said hubs being disposed toward the outer tube top end;
  (2) a pair of circular bushings opposingly disposed within said hubs, said bushings cooperatively receiving a drive shaft and allowing the drive shaft to rotate within said hubs;
  (3) the pair of circular hubs operating cooperatively with said bushings to receive and secure the drive shaft within the outer tube;
  (4) a circumferential top plate ring, having a top plate ring inner surface and an circular top plate ring outer surface, and being attached to the outer tube inside surface and located proximally to the pair of opposing hubs, toward the outer tube bottom end;
  (5) a crank assembly comprising a crank handle operating cooperatively and integrally with the drive shaft, and with a drive gear;
  (6) the crank handle having a free end and an opposing drive shaft end;
  (7) the drive shaft having a crank shaft end and an opposing tube shaft end;
  (8) the drive shaft attaching perpendicularly, cooperatively and integrally to the crank handle at the drive shaft end;
  (9) the drive shaft being seated within the pair of circular hubs, thru the outer tube, and secured in place by said hubs;
  (10) the drive gear having a crank side and an opposing drive gear side, and being centrally and circumferentially located along the drive shaft and within the outer tube, operating conformably with the drive shaft and having the crank side oriented adjacent to the outer tube inside surface;
  (11) the crank assembly being cooperatively and integrally assembled allowing the crank handle, the drive shaft, and the drive gear to turn in unison;
(b) operatively associating and overlying an inner tube with said outer tube, said inner tube having an inner tube top end and an opposing inner tube bottom end, and an inner tube inside surface and an opposing inner tube outside surface, said outer tube overlapping the inner tube directionally from the inner tube top end, and the inner tube further comprising:
  (1) an internally threaded acme nut having a threaded inner nut surface;
  (2) said acme nut circumferentially attached to the inner tube inside surface and disposed for receiving a partially threaded, elongated acme screw, said acme nut being located proximally to the inner tube top end;
(c) having an acme screw assembly comprised of said elongated acme screw suspensionally located and freely rotatable within the inner tube and cooperatively engaged to the inner tube within the internally threaded acme nut, and an acme screw top surface and an opposing acme screw bottom surface, an unthreaded first rod surface contiguous to the acme screw top surface and an unthreaded second rod surface radially larger than said first rod surface and radially smaller than a threaded screw surface to said elongated acme screw, and an acme screw threaded top surface, said second rod surface being located contiguous to and between said first rod surface and the acme screw threaded top surface, the acme screw assembly further comprising:
  (1) a screw gear circumferentially, cooperatively, and integrally fitted on the acme screw top surface and around said first rod surface by a fastening means to cooperatively and differentially engage the drive gear and concurrently drive said elongated acme screw;
  (2) a cylindrical top plate having a top plate upper surface, an opposing top plate lower surface, and a centrally located top plate aperture thru said top plate;
  (3) said top plate circumferentially and cooperatively engaged onto said elongated acme screw having said second rod surface located through said top plate aperture, the top plate upper surface being located immediately against the top plate ring inner surface, and said top plate being secured to the outer tube by a plurality of fastening means;
  (4) a thrust bearing, having an upper bearing surface and an opposing lower bearing surface, securely and circumferentially engaged around said elongated acme screw along said second rod surface and immediately, vertically beneath the top plate;
  (5) a washer interposed between the thrust bearing and the acme screw threaded top surface, and around said elongated acme screw, allowing the thrust bearing to revolve freely about said second rod surface;

(6) the screw gear, top plate, thrust bearing, and washer being circumferentially and sequentially engaged onto said elongated acme screw;

(7) the acme screw assembly being linearly and cooperatively assembled allowing the screw gear, thrust bearing, washer and said elongated acme screw to turn in unison;

(8) the acme screw assembly extending vertically above the inner tube top end;

(9) the drive gear on the crank assembly being situated immediately against and differentially engaging the screw gear to the acme screw assembly for driving said elongated acme screw;

(d) having the crank assembly cause said elongated acme screw to thread vertically through the internally threaded acme nut and the acme screw assembly to concurrently move vertically when the drive gear to the crank assembly is activated by cranking the crank assembly;

(e) engaging the top plate ring inner surface to the top plate upper surface rendering the acme screw assembly load-bearing to move the outer tube vertically, when the acme screw assembly is activated by cranking the crank assembly;

(f) linearly and integrally assembling the height adjustment mechanism, telescopically and slidably encasing the inner tube with the outer tube, such that the outer tube can be vertically adjusted with respect to the inner tube when the crank assembly is operated;

(g) securely installing the height adjustment mechanism to a towing vehicle by a mounting means, said mounting means located at the inner tube bottom end of the height adjustment mechanism;

(h) providing the trailer with a trailer hitch including a hitching end integrally secured to the outer tube outside surface and a trailer end;

(i) integrally attaching the trailer to the trailer hitch at the trailer end;

(j) concurrently adjusting the trailer vertically when the crank assembly to the height adjustment mechanism is operated; and (k) thereby adjusting the height of the trailer with the height adjustment apparatus.

8. A height adjustment method as in claim 7, including:

(a) making said mechanism of hardened steel.

9. A height adjustment method as in claim 7, including:

(a) making said mechanism of material to withstand at least 39,000 pounds of shear force.

10. A height adjustment method as in claim 7, including:

(a) having the trailer be a gooseneck trailer.

11. A height adjustment method as in claim 7, including:

(a) cooperatively disposing a key keeper aperture in the outer tube toward the outer tube bottom end, the key keeper aperture having a threaded inner key surface for cooperatively receiving a threaded key screw;

(b) containing a key way set vertically in the inner tube surface to cooperatively hold said key screw in place against the inner tube; and (c) lodging the threaded key screw in the key way groove securing the outer tube in place when said key screw is screwed into the key keeper aperture, co-axially aligning the inner tube with the outer tube, preventing lateral movement of the height adjustment mechanism; and (d) thereby preventing the trailer hitch from adjusting laterally inadvertently.

12. A height adjustment method as in claim 7, including:

(a) reversibly attaching the crank handle to the drive shaft by the fastening means, and holding the free end in place against the outer tube;

(b) utilizing the free end of the crank handle as a locking means for preventing vertical movement of the height adjustment mechanism; and (c) thereby preventing the trailer hitch from moving vertically inadvertently.

* * * * *